United States Patent [19]

Yamasaki

[11] 4,310,127
[45] Jan. 12, 1982

[54] FISHING SPINNING REEL
[75] Inventor: Tatsuya Yamasaki, Fuchu, Japan
[73] Assignee: Ryobi Limited, Japan
[21] Appl. No.: 875,486
[22] Filed: Feb. 6, 1978
[30] Foreign Application Priority Data
   Feb. 7, 1977 [JP] Japan .................................. 52-13907
[51] Int. Cl.³ ............................................ A01K 89/00
[52] U.S. Cl. ................................ 242/84.1 J; 242/96
[58] Field of Search .................... 242/84.1 J, 96, 84.8; 74/547, 546, 545

[56] References Cited
U.S. PATENT DOCUMENTS

Re. 15,888  8/1924  McCauley ....................... 74/547 X
1,928,487   9/1933  Hammerly ....................... 74/547 X
3,948,117   4/1976  Kimura ......................... 242/84.1 J FOREIGN PATENT DOCUMENTS
578016  6/1958  Italy ..................................... 74/547

Primary Examiner—Leonard D. Christian
Attorney, Agent, or Firm—William A. Drucker

[57] ABSTRACT

In a fishing spinning reel of the type wherein a rotor is rotated by a handle shaft through gears, a handle arm is pivotally mounted on the outer end of the handle shaft to be movable between an erected position and a folded position. A slide key is slidably mounted on the lower surface of the handle arm so as to engage the handle shaft thereby positively locking the handle arm in the erected and folded positions.

3 Claims, 5 Drawing Figures

FISHING SPINNING REEL

BACKGROUND OF THE INVENTION

This invention relates to a fishing spinning reel, more particularly a handle folding device of a fishing spinning reel.

Generally, in a fishing spinning reel, a rotor having a relatively large diameter and a spool are mounted on the main body of the reel so that the handle is projected outwardly from the main body so as not to interfere with the operation of the rotor or the spool. Accordingly, the handle is generally constructed to be foldable so that it can be folded when transporting or packing the fishing spinning reel. In most of the prior art handle folding devices, the handle arm is connected to the handle shaft by a releasable screw so that it takes a long time to fold and erect the handle at the time of beginning and terminating fishing. Moreover, during the use of the fishing spinning reel, especially when taking up the fishing line the screw often becomes loose, thus causing the handle to jolt.

When the handle becomes loose, it is necessary to tighten the screw. This is especially disadvantageous in a case where the rotor is freed to alternately rotate the rotor in the forward and reverse directions is accordance with the movement of a fish to pull up the same while preventing excessive tension of the line. Furthermore, when the screw is tightened it is necessary to use a reverse rotation preventing device so that a thin line might be severed which is used to alternately rotate the rotor in the forward and reverse directions as above described.

SUMMARY OF THE INVENTION

Accordingly, it is an object of this invention to provide an improved fishing spinning reel which can eliminate the disadvantages described above and can readily and rapidly fold and erect the handle arm.

Another object of this invention is to provide an improved fishing spinning reel which can positively hold the handle arm in the folded and erected positions and can prevent loosening of the handle arm during use.

According to this invention there is provided a spinning reel, comprising a reel body, a rotor connected to the reel body, a handle shaft supported by the reel body for rotating the rotor, a handle arm pivotally mounted on the outer end of the handle shaft, a slide key slidably mounted on the handle arm and spring means for urging one end of the slide key into locking engagement with the outer end of the handle shaft.

When the slide key is held in locking engagement with the outer end of the handle shaft, the handle arm is firmly held in the folded or erected position whereas when the slide key is disengaged it is possible to readily fold and erect the handle arm.

DESCRIPTION OF THE PREFERRED EMBODIMENT

Figure 1:
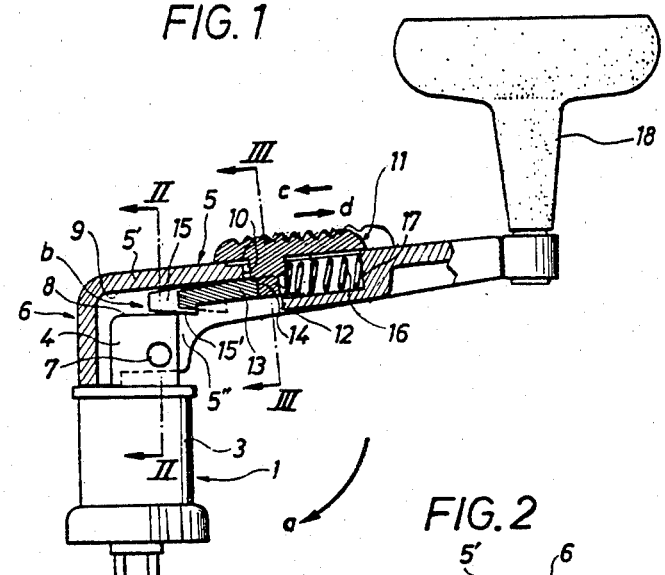
FIG. 1 is a side view, partly in longitudinal section showing the handle folding device of this invention in the erected position.
Figure 2:
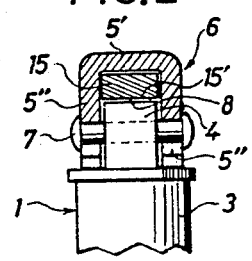
FIGS. 2 and 3 are sectional views respectively taken along lines II—II and III—III in FIG. 1.
Figure 3:
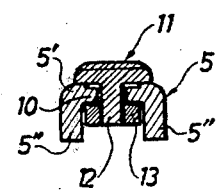

As shown in FIG. 1, the fishing spinning reel of this invention comprises a handle shaft 1, a master gear 23 secured to shaft 1 for rotating a rotor 24. The master gear 23 is journalled by a bearing 22 secured to a reel body 21 connected to the rotor 24. The handle shaft 1 extends outwardly from the reel body 21 and a projection 4 having a smaller cross-sectional area than the outer end 3 of the handle shaft 1 is provided for the outer end. The projection 4 is displaced from the axis of the outer end 3 toward the direction in which a handle arm 5 is folded and erected. The base 6 of the handle arm 5 is pivotally connected to the projection 4 by a pivot pin 7.

More particularly, the handle arm 5 comprises an inverted U shaped member having a upper wall 5' and depending side walls 5" for clamping the projection 4 between the side walls. The pivot pin 7 and the base 6 are sufficiently spaced apart so that the handle arm 5 can rotate in the direction indicated by arrow (a) from the erected position shown in FIG. 1 to the folded position shown in FIG. 4. The rear surface 9 of the upper wall 5' and the end 8 of the projection 4 are also spaced apart to define a space (b) therebetween for accommodating a slide key as will be described later.

A longitudinal slot 10 is provided at a suitable position of the upper wall 5' of the handle arm 5, and the leg 12 of a slide button 11 is slidably received in the slot. The leg 12 has a polygonal cross-section so that it can not rotate with respect to the slot 10 and a slide key 13 extending between both side walls 5" is secured to the lower end of the leg. The slide key 13 has a polygonal opening 14 for receiving the leg 12. When the key 13 is secured to the lower end of the leg 12 by suitable fastening means the fore end 15 of the key projects just above projection 4 as shown in FIG. 1. The thickness of the fore end 15 is decreased gradually toward the end, and the lower surface 15' of the fore end 15' is also inclined to assume a wedge shape. When the handle arm 5 is erected as shown in FIG. 1 the lower surface 15' engages the end surface 8 of the projection 4 thereby securely holding the handle arm in the erected position. The slide key 13 is biased toward left as viewed in FIG. 1 by a spring 16 received in a recess 17 so that its fore end 15 is urged against the projection 4. A knob 18 is rotably connected to the rear or outer end of the handle arm at an angle with respect to the handle arm.

Figure 4:
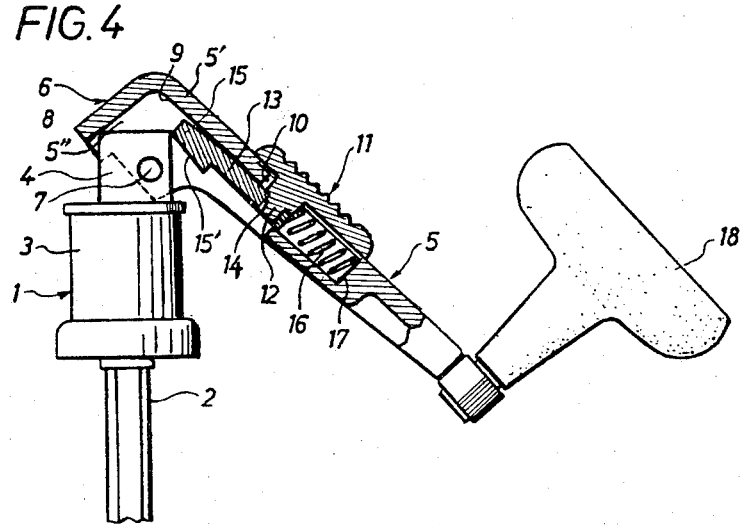
FIG. 4 is a view similar to FIG. 1 showing the handle in the folded position.
Figure 5:
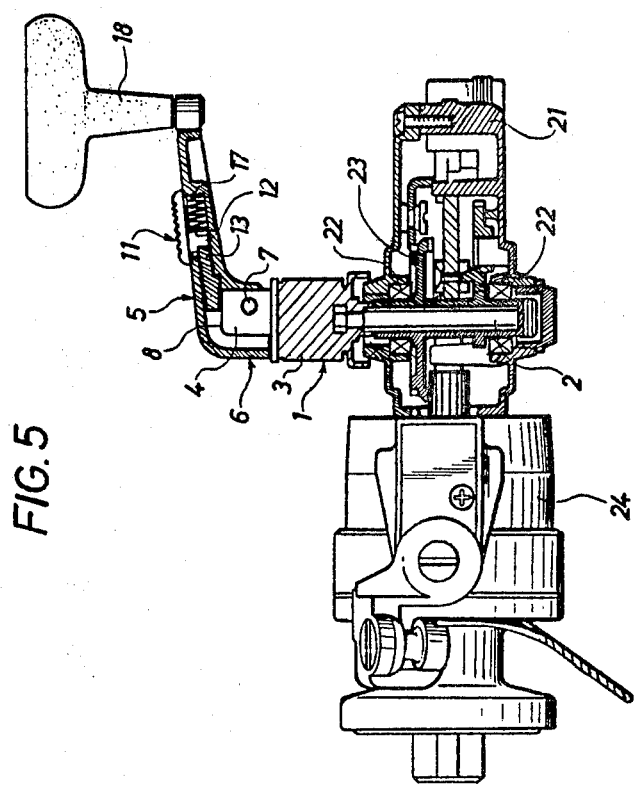
FIG. 5 is a side view, partly in longitudinal section, showing the entire structure of the fishing spinning reel embodying the invention.

To erect the handle arm from the folded position shown in FIG. 4 to the erected position shown in FIG. 1, the button 11 of the slide key 13 is moved in the direction indicated by arrow (d) against the force of spring 16 and then the handle arm is rotated in the counterclockwise direction about pivot pin 7 to the position shown in FIG. 1. Then the button 11 is released so as to urge the slide key 13 to the wedging position thus securely holding the handle arm in the erected position.

To fold the handle arm, the button 11 is moved in the direction of arrow (d) to disengage the fore end 15 of the slide arm from the projection 4. Consequently, it is possible to rotate the handle arm in the clockwise direction to the folded position shown in FIG. 4. In this position the slide button 11 is released to urge the slide key into the wedging position thus securely holding the handle arm in the folded position. Instead of providing the inclined surface 15' for only the slide key, an inclined surface may be provided for the upper end of the projection for cooperating with the inclined surface 15'.

As above described the invention provides a fishing spinning reel having an improved foldable handle that can readily be folded and erected and can be positively held in the folded and erected positions.

Although the invention has been described in terms of a preferred embodiment thereof, it should be understood that the invention is by no means limited thereto but many changes and modifications may be made without departing the true spirit and scope of the invention as defined in the appended claims.

What is claimed is:

1. A fishing spinning reel comprising:
   (i) a reel body
   (ii) a handle shaft journalled for rotation on said reel body and including an abutment portion with a first axially-facing abutment face and a second radially-facing abutment face
   (iii) a handle arm mounted on the abutment portion by pivot means having a pivoting axis transverse to the axis of rotation of the handle shaft, whereby the handle arm is movable about said pivoting axis into a first position substantially radial to the axis of rotation of the handle shaft and a second position of folding towards the axis of rotation of the handle shaft, said handle arm including an abutment surface which in one of said positions is spaced axially from the first abutment face of the shaft and which in the other of said positions is spaced radially from said second abutment face of the shaft,
   (iv) a locking element carried by the handle arm and movable longitudinally of the arm into a locking state in which it engages between the abutment surface of the arm and selectively the first or second abutment face of the shaft to lock the handle arm in the respective position, and into a retracted state, and
   (v) resilient means acting between the handle arm and the locking element to urge the locking element into the locking state.

2. A fishing spinning reel, as claimed in claim 1, wherein said locking element is slidable on the handle arm and is coupled to an operating knob.

3. A fishing spinning reel, as claimed in claim 1, wherein said locking element is a wedge.

* * * * *